United States Patent [19]

George et al.

[11] Patent Number: 5,871,800
[45] Date of Patent: Feb. 16, 1999

[54] METHOD FOR BLEACHING NUTS

[75] Inventors: Dewey P. George, San Andreas; Ronald James Rigge, Pleasanton; Delbert L. Williams, Waterford, all of Calif.; Ronald D. Hansberry, Canby, Oreg.

[73] Assignee: Ankel, Inc., Waterford, Calif.

[21] Appl. No.: 694,555

[22] Filed: Aug. 9, 1996

Related U.S. Application Data

[63] Continuation-in-part of Ser. No. 562,341, Nov. 22, 1995, abandoned, which is a continuation-in-part of Ser. No. 35,721, Mar. 23, 1993, Pat. No. 5,391,389.

[51] Int. Cl.⁶ .................................................. A23L 1/277
[52] U.S. Cl. ...................... 426/632; 426/489; 426/495; 426/520; 426/640
[58] Field of Search .................................. 426/632, 489, 426/495, 520, 640

[56] References Cited

U.S. PATENT DOCUMENTS

| | | | |
|---|---|---|---|
| 1,558,963 | 10/1925 | Christie | 426/255 |
| 2,155,923 | 4/1939 | Armstrong | 99/231 |
| 2,156,406 | 5/1939 | Stagmeier | 146/219 |
| 2,273,183 | 2/1942 | Edes | 146/32 |
| 2,277,485 | 3/1942 | Frazier et al. | 99/126 |
| 2,651,345 | 9/1953 | Schoolcraft | 146/231 |
| 2,655,449 | 10/1953 | Almquist | 426/261 |
| 2,687,155 | 8/1954 | D'Aquin et al. | 146/231 |
| 3,520,340 | 7/1970 | Takeuchi | 426/231 |
| 4,276,316 | 6/1981 | Sharma | 426/436 |
| 4,959,236 | 9/1990 | Gennerson et al. | 426/288 |
| 5,219,601 | 6/1993 | Devic | 426/258 |
| 5,391,389 | 2/1995 | George et al. | 426/632 |

*Primary Examiner*—Helen Pratt
*Attorney, Agent, or Firm*—Limbach & Limbach L.L.P.

[57] ABSTRACT

A method and apparatus for bleaching the shells of in-shell nuts and for bleaching the meats of shelled nuts involves wetting the nuts with an alkaline solution and then with a peroxygen solution. The two substances react to form a bleaching agent which whitens the shell or nut meat. Slight mechanical brushing may be used to dislodge debris loosened by the process. The apparatus includes means for recycling the reagents through the system without causing the desired temperature and concentration of the reagents to deviate significantly from predetermined values.

9 Claims, 5 Drawing Sheets

METHOD FOR BLEACHING NUTS

This is a continuation in part of application Ser. No. 08/562,341 filed Nov. 22, 1995, now abandoned, which was a continuation in part of application Ser. No. 08/035,721, which was filed on Mar. 23, 1993, now U.S. Pat. No. 5,391,389.

INVENTORS

Dewey P. George
Ronald J. Rigge
Delbert L. Williams
Ronald D. Hansberry

FIELD OF THE INVENTION

The present invention relates to the field of bleaching in-shell nuts and nut meats, and particularly to bleaching nuts having dark shells and/or dark nut meats.

BACKGROUND OF THE INVENTION

The shells of several types of nuts, including walnuts and hazelnuts, have a very dark natural color. Dark-shelled nuts that are harvested for food use are routinely bleached to make the shells much whiter in color and thus more commercially desirable.

Macadamia nuts are normally sold in shelled form. The meats of the shelled nuts are normally a creamy white color. However, the meats of these nuts frequently become stained to a light brown color while the nuts are still in the shell. These nuts, which comprise a significant percentage of the macadamia nuts grown, are commercially undesirable because of their unpleasant appearance and because the stained nuts may discolor foods that are prepared using the nuts. The stained nuts are normally separated from the remaining nuts and discarded.

Various processes have been used for bleaching the shells of nuts.

These processes have enjoyed limited success. For the most part, existing processes are unsatisfactory because they utilize chemicals having toxic emissions, effluents, or residues.

For example, in-shell hazelnuts are currently bleached using an oxidation bleaching process. The shells of the nuts are wetted with water and the nuts are placed on a grate positioned over pots of burning sulfur dioxide. The fumes reach the nuts and react with the water on the shells to form sulfuric acid which bleaches the skins of the nuts. This process produces toxic sulfur emissions and also leaves a potentially hazardous byproduct, sulfuric acid, on the nut shells. Concern over the potentially toxic effects of sulfur residues has led countries in Europe to bar importation of products having a sulfur residue, and regulatory agencies within the United States are beginning to take steps that would prevent use of the sulfur oxidation process due to the environmental hazards created by the sulfur emissions.

Current methods of bleaching walnuts also result in toxic residues and effluents. One method utilizes the application of chlorine bleach to the surfaces of the nuts, a process which has been banned in European countries. Another involves a mixture of hydrogen peroxide and sodium hydroxide—a caustic agent frequently referred to as lye—and produces toxic effluents which, for environmental reasons, are difficult to dispose of. Peroxide processes using lye are strongly alkaline and produce unstable alkaline solutions above pH 9 which require neutralization before final disposal.

To date there is no widely-used method for bleaching the stained meats of shelled nuts. The only currently acceptable solution for discolored nut meats is that of separating the stained nut meats from the unstained ones and discarding them.

SUMMARY OF THE INVENTION

It is an object of the present invention to provide a method and apparatus for bleaching in-shell nuts and the meats of shelled nuts without producing toxic emissions, effluents, or residues, and without adversely affecting the taste, appearance, or shelf life of the nuts.

The present invention involves wetting the nut meats or shells in two steps: first with an alkaline solution and then with a peroxygen solution. The two substances then react on the surface of the nut to break the organic bonds which form the color of the nut shell or meat and which thereby whiten the skin. The pH of the effluent from this invention is near neutral and has no disposal or environmental concerns.

The preferred apparatus recycles the alkaline and peroxygen solutions separately within the system, while closely regulating the temperature and concentration of the reagents and avoiding contamination of fresh peroxide solution.

DETAILED DESCRIPTION OF THE INVENTION

Figure 1:
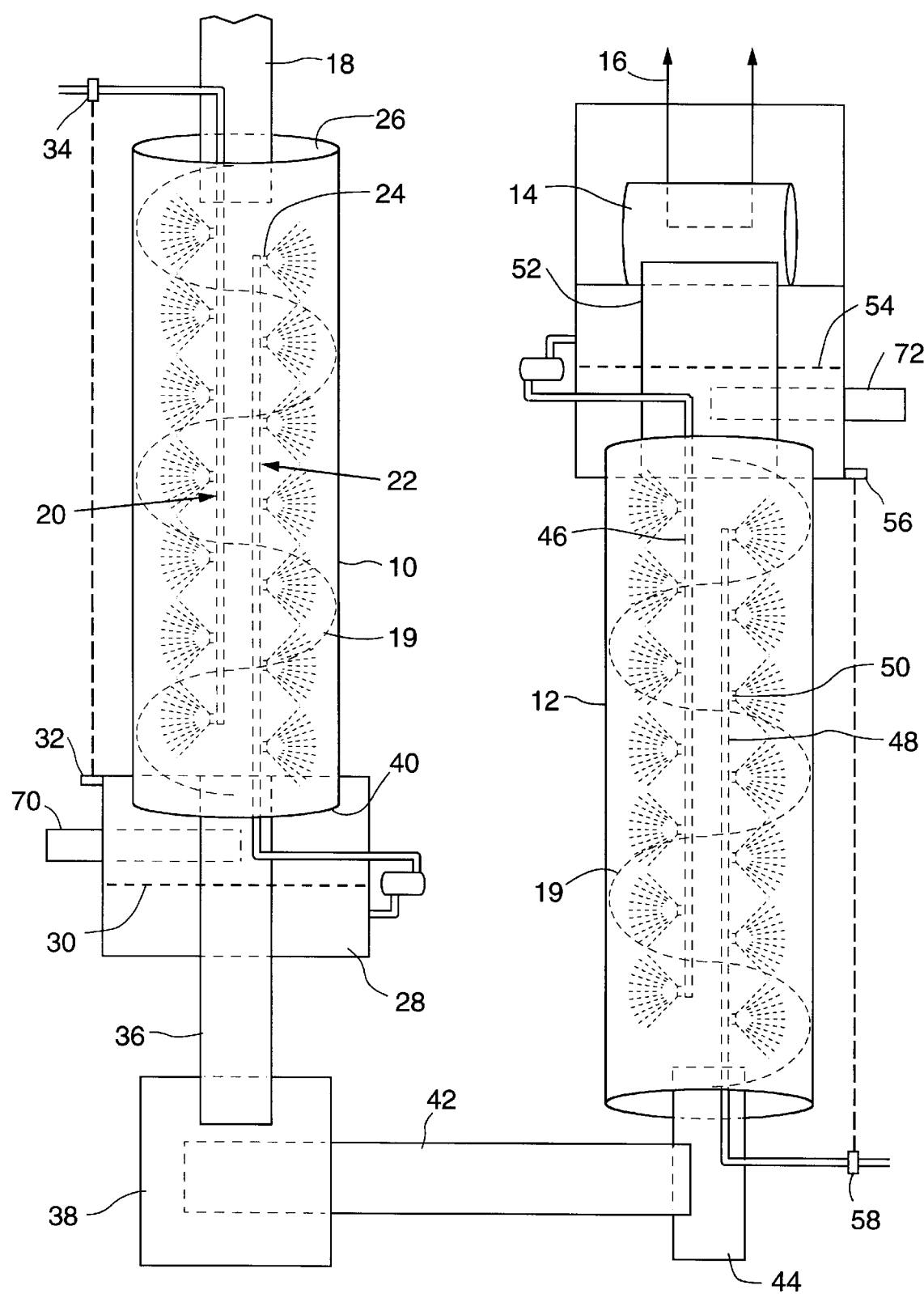
FIG. 1 is a schematic representation of the nut bleaching apparatus of the present invention.

The method of the present invention generally involves wetting the nuts with an alkaline solution drying the nuts and subsequently wetting them with a peroxygen solution. A third step of mechanically brushing the nuts may also be utilized to remove debris which become loosened during the bleaching process. This process, which may also be useful for bleaching other materials such as wood products, provides for a minimal and very economic use of buffered alkaline agents which produce pH neutral effluents that are safely disposed of as-is in water systems. Additionally, nuts processed by this invention are not contaminated by objectionable residues or subject to objectionable flavor changes.

The first step of the process preferably involves wetting the nuts with an alkaline solution. Alkaline solutions of 1% to saturated having approximate temperatures of 40° to 180° F. may be used in the process, particularly when applied to the nuts for durations of between 2 and 20 seconds for bleaching shells, and up to 3 minutes for bleaching nut meats. Preferably sodium bicarbonate is used at temperatures between about 100° and 180° F. The preferred method utilizes food grade sodium carbonate or sodium bicarbonate.

The nuts are next preferably allowed to drain and to dry. In the preferred form of the invention, the nuts are drained rapidly by tumbling them between downwardly inclined baffles which shake the solution off of the nuts and move the solution away by surface tension on the baffles. Drying allows the nuts to cool and thereby reduces the likelihood of rancidity, breakage, and reduced shelf life. Drying at ambient temperature may last up to 30 minutes without significant adverse effect on the bleaching process. Preferably drying is performed by tumbling the nuts on a heated surface.

After drying, the nuts are wetted using a peroxygen compound. Hydrogen peroxide is most preferred for economic reasons and also because it will most adequately remove any discoloration of the shells or nut meats which the alkaline solution may cause.

Peroxygen concentrations of 10–40% work particularly well in the process when applied to the nuts at temperatures of approximately 50° to 150° F. for durations of between 2–20 seconds for bleaching shells and up to 3 minutes for bleaching nut meats. Although bleaching will be successful when the nuts are treated with peroxygen solutions having temperatures greater than 150° or higher, higher temperatures should preferably be avoided with longer contact time to prevent deterioration of the shells or cooking, rancidity, and breakage of the nuts.

When the peroxygen solution is applied to the nuts, the peroxygen and the alkaline solutions undergo a chemical reaction. The first wetting step causes the alkaline solution to slightly saturate the shell or nut meat during the first wetting step, so that applying the peroxygen solution to the nut causes the chemical reaction between the two solutions to occur directly on the shell or the nut meat. The reaction causes the formation of an alkaline hydroperoxide radical, which is a bleaching agent that breaks the organic carbon-carbon double-bonds that causes the color in the shell or nut meat. Because this reaction occurs on the surface of the nut, the full magnitude of the reaction is utilized in bleaching the surface.

The reaction of the peroxygen and alkaline solutions forms and liberates a burst of gas bubbles. If residues such as soil, ground mould, or bacteria such as aflotoxins are present on the shell, gas bubbles will form between the nut shell and the residues, causing the residues to loosen from the shell. A mechanical method such as light brushing may be used to remove the loosened residues and to lightly polish the shell, and the nuts are then allowed to dry.

The concentrations, temperatures, and wetting times described above are preferred ranges. For both the peroxygen solution and the alkaline solution, many different combinations of concentration, temperature, and wetting time will cause bleaching of the shells or nut meats and these variables may be adjusted to provide varying levels of whiteness of nut meats or shells. For example, satisfactory bleaching will occur even where 1% solutions of the alkaline and peroxygen solutions are applied at room temperature to the nuts, although wetting times of several minutes would be necessary. Specific examples of preferred solutions for use on in-shell walnuts, in-shell hazelnuts and shelled macadamia nuts will next be described.

EXAMPLE 1—In-shell Walnuts

In the preferred method, the in-shell walnuts are wetted with 10% $NaHCO_3$ at 120° F. for 2 to 5 seconds. The nuts are next treated for 2–5 seconds with a 5% solution of hydrogen peroxide maintained at 120° F. Once the nuts have been exposed to the hydrogen peroxide, the hydrogen peroxide and the sodium bicarbonate chemically react to bleach the shell as described above.

EXAMPLE 2—In-shell Hazelnuts

The preferred solutions for use on in-shell hazelnuts create a bleached shell color that is considerably whiter than is achieved with the sulfur bleaching process described above.

In the preferred solution for use on hazelnuts, the preferred alkaline treatment comprises wetting the nuts with 10% $NaHCO_3$ at 140° F. for approximately 10 seconds, and subsequent treatment for approximately 10 seconds with a 10% solution of hydrogen peroxide maintained at 140° F.

As described above, the desired color may be adjusted by modifying the exposure time, concentration, and temperature of the substances. For example, a color comparable to that achieved using the sulfur bleaching process described above may be achieved using a 10% solution of $NaHCO_3$ at 120° F. for approximately 5 seconds, and subsequent treatment for approximately 5 seconds with a 3% solution of hydrogen peroxide maintained at 120° F.

EXAMPLE 3—Shelled Macadamia Nuts

The preferred solutions for use on shelled macadamia nuts are 10% $NaHCO_3$ at 140° F. for approximately 1 minute and 40 seconds, and subsequent treatment for approximately 1 minute with a 10% solution of hydrogen peroxide maintained at 140° F.

The nuts may be wetted with the alkaline and peroxygen solutions by a variety of techniques. One apparatus for carrying out the invention is shown in FIG. 1. The apparatus generally comprises a pair of rotating spray drums 10, 12 which apply the sodium bicarbonate and hydrogen peroxide solutions to the nuts, a debris-dislodging device 14 which mechanically removes debris such as mould, dirt, or contaminants such as bacteria at the end of the process, and an air separator (not shown) which separates the removed debris from the nuts. Because, as described above, the temperature, concentration, and duration of exposure must be maintained within specified ranges, the preferred apparatus is designed to ensure that the solution applied to the nuts is maintained at the predetermined temperature and concentration values.

The nuts are carried on a standard conveyer 18 into the first spray drum 10. The spray drum 10 is positioned at a slight downward angle and includes a standard screw auger (not shown) for pushing the nuts through the spray drum. The various parameters for the spray drum configuration are dependent upon the amount of exposure time which is desired for the nuts. Positioned inside the spray drum 10 are two non-rotating rows 20, 22 of spray nozzles 24 which spray sodium bicarbonate solution onto the nuts as the nuts are rotated inside the spray drum. Two variables, the speed of rotation of the spray drum and the area of the inner surface 26 of the spray drum falling within the path of the spray 27, determine how long the nuts are exposed to the solution per rotation of the drum. Another three variables, the angle of the spray drum, the length of the spray drum, and the speed at which the screw auger pushes the nuts out of the drum, determine how long the nuts are inside the drum and thus how many times the nuts pass through the spray 27. These five variables must therefore be chosen based upon the length of time for which it is desired to expose the nuts to the solution. A variable speed spray drum is preferred to enable exposure time to be adjusted. Because bleaching in-shell nuts requires very short exposure times, very short spray drums which allow for brief wetting periods will preferably be used for those applications. An apparatus utilizing a single spray directed onto the conveyer or one in which the conveyor carries the nuts under a cascade of solution may alternatively be used to wet the nuts with the solutions.

The spray nozzles 24 are preferably arranged in two parallel rows 20, 22 within the spray drum 10. The first row 20 is connected to a fresh source of sodium bicarbonate (not shown) while the second row 22 receives sodium bicarbonate from a recycle tank 28 positioned at the exit 40 of the spray drum. It is not necessary for the spray nozzles to deliver a high pressure stream of solution onto the nuts because the fluid pressure is not intended to be used for bleaching or removal of debris. Because recycled solutions are delivered through the nozzles on the second row, large nozzles are preferable to prevent debris from clogging them. This will naturally result in a fairly low pressure spray.

The preferred apparatus is configured to recycle the runoff sodium bicarbonate, which is the sodium bicarbonate that runs off of the nuts during and after spraying, back onto the nuts through the second row 22 of spray nozzles. The runoff solution may carry dirt and other materials off the nuts and thus may become diluted. It is important, however, to maintain the concentration of the solutions being used to treat the nuts at a predetermined level so that the preselected concentration-dependant values for temperature and exposure time will be adequate for successful bleaching of the nuts. As will next be described, the preferred apparatus recycles the runoff solution while maintaining the overall concentration of sodium bicarbonate being applied to the nuts.

A recycle tank 28 located at the bottom of the spray drum 10 collects the runoff solution as it flows out of the spray drum. This collected solution is passed through a trash screen 30, and a pump 31 pumps it to the second row 22 of spray nozzles 24 where it is sprayed onto the nuts. Positioned in the recycle tank 28 is a monitor 32 which detects the concentration of the runoff solution and which signals a concentration regulator 34 if adjustments in concentration are necessary. The concentration regulator 34 is located at the source of the fresh solution feeding into the first row 20 of spray nozzles 24. If the monitor 32 detects that the concentration of the solution in the recycle tank 28 is less than the predetermined concentration for treating the nuts, the concentration of the incoming fresh solution is increased so that the concentration of the mixture of fresh and recycled solutions reaching the nuts is maintained at the predetermined level.

The temperature of the solution must also be maintained at predetermined levels. The fresh source of sodium bicarbonate is heated to the desired temperature by conventional heating means (not shown). A thermostatic regulator (not shown) positioned in the recycle tank monitors the temperature of the run-off solution and makes necessary adjustments to the temperature of the runoff solution.

A conveyer 36 for transporting the nuts to a holding hopper 38 is positioned near the exit 40 of the spray drum 10. The holding hopper holds the nuts during the draining and drying period. After the draining and drying period, an elevator 42 carries the nuts from the holding hopper to a feed conveyer 44 which transports them into the second spray drum 12 for application of hydrogen peroxide.

The second spray drum 12 operates the same as the first, with concentration and temperature being monitored and adjusted as described above.

A conveyer 58 carries the nuts from the second drum 12 to a debris-dislodging device 14, such as a rotating cylindrical brush, which separates from the nuts any residues, mould, or bacteria that have been loosened by the reaction of the sodium carbonate with the hydrogen peroxide as described above. A cylindrical brush is preferable because it does not abrade the nuts but rather dislodges the already loosened debris by poking through it and pulling it away from the nuts and also because it lightly polishes the shell.

A final conveyor 16 next carries the nuts from the cylindrical brush or other debris-dislodging device 14 to an air separator (not shown). At this point the nuts on the conveyor are likely to be surrounded by pieces of the debris that was removed by the cylindrical brush. The air separator uses an air stream to separate the relatively heavy nuts from the lighter weight debris.

Figure 2:
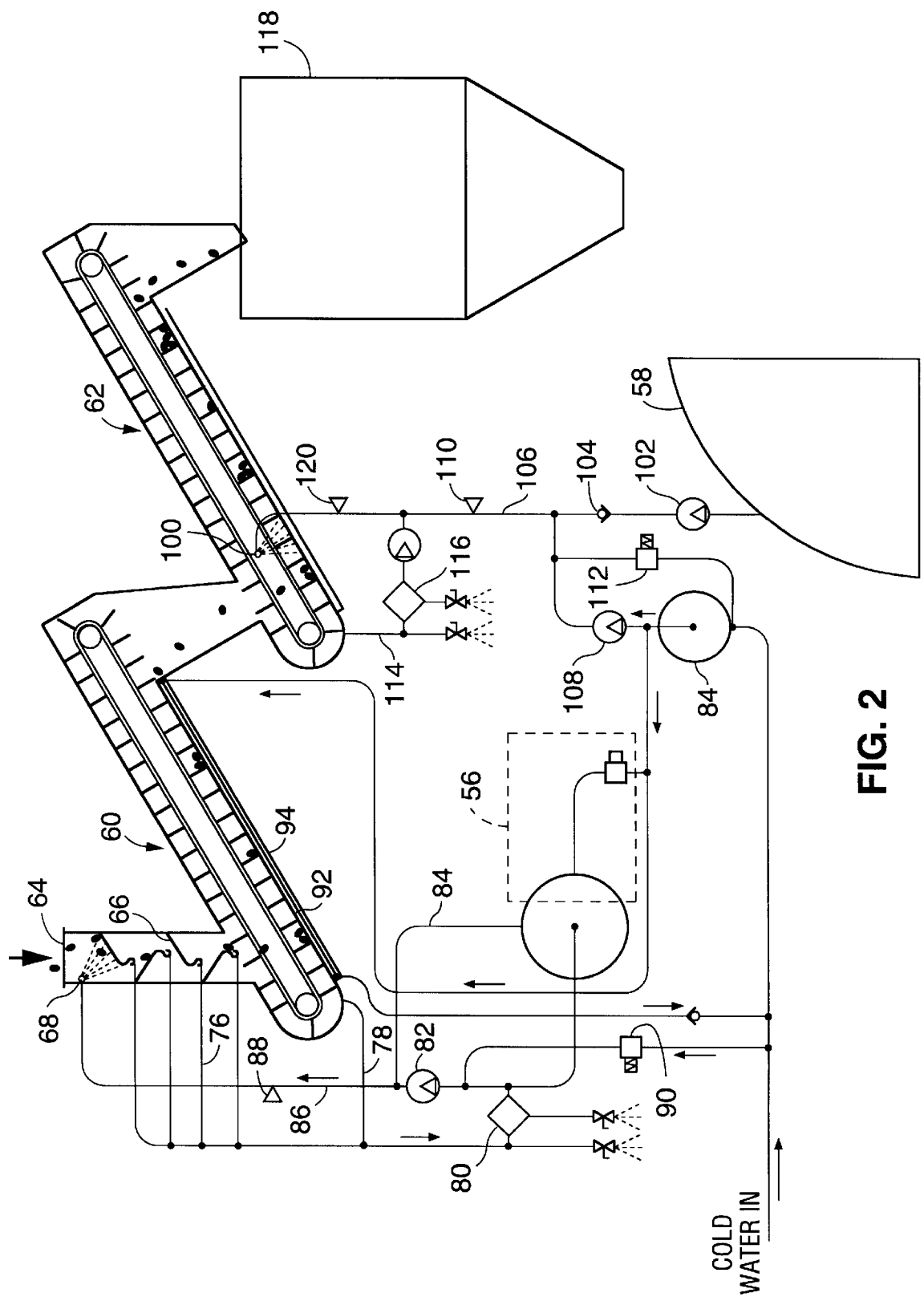
FIG. 2 is a schematic representation of an alternative and preferred apparatus for practicing the present invention.
Figure 3:
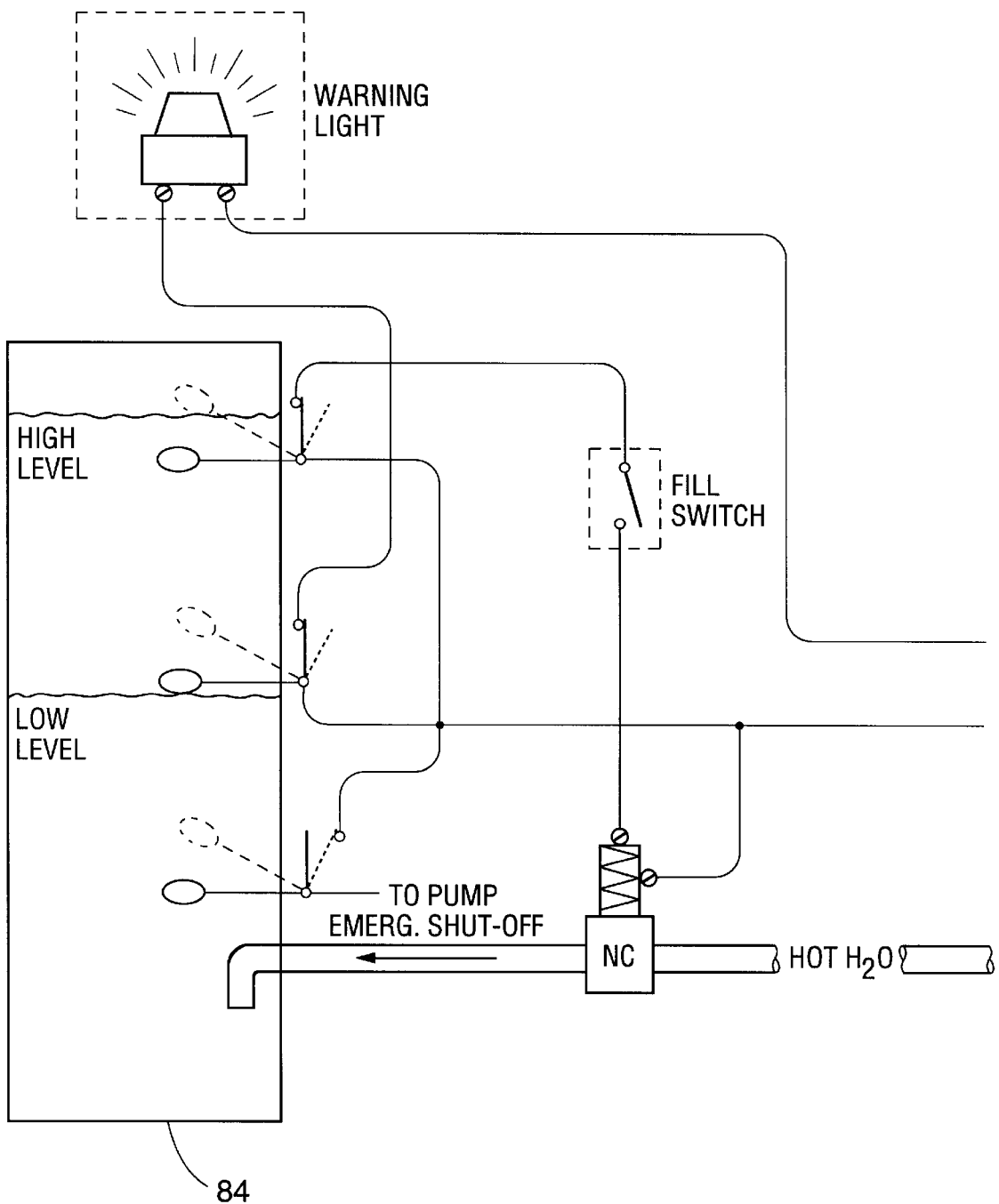
FIG. 3 is a schematic representing the fill controls for the bicarbonate tank in FIG. 2.
Figure 4:
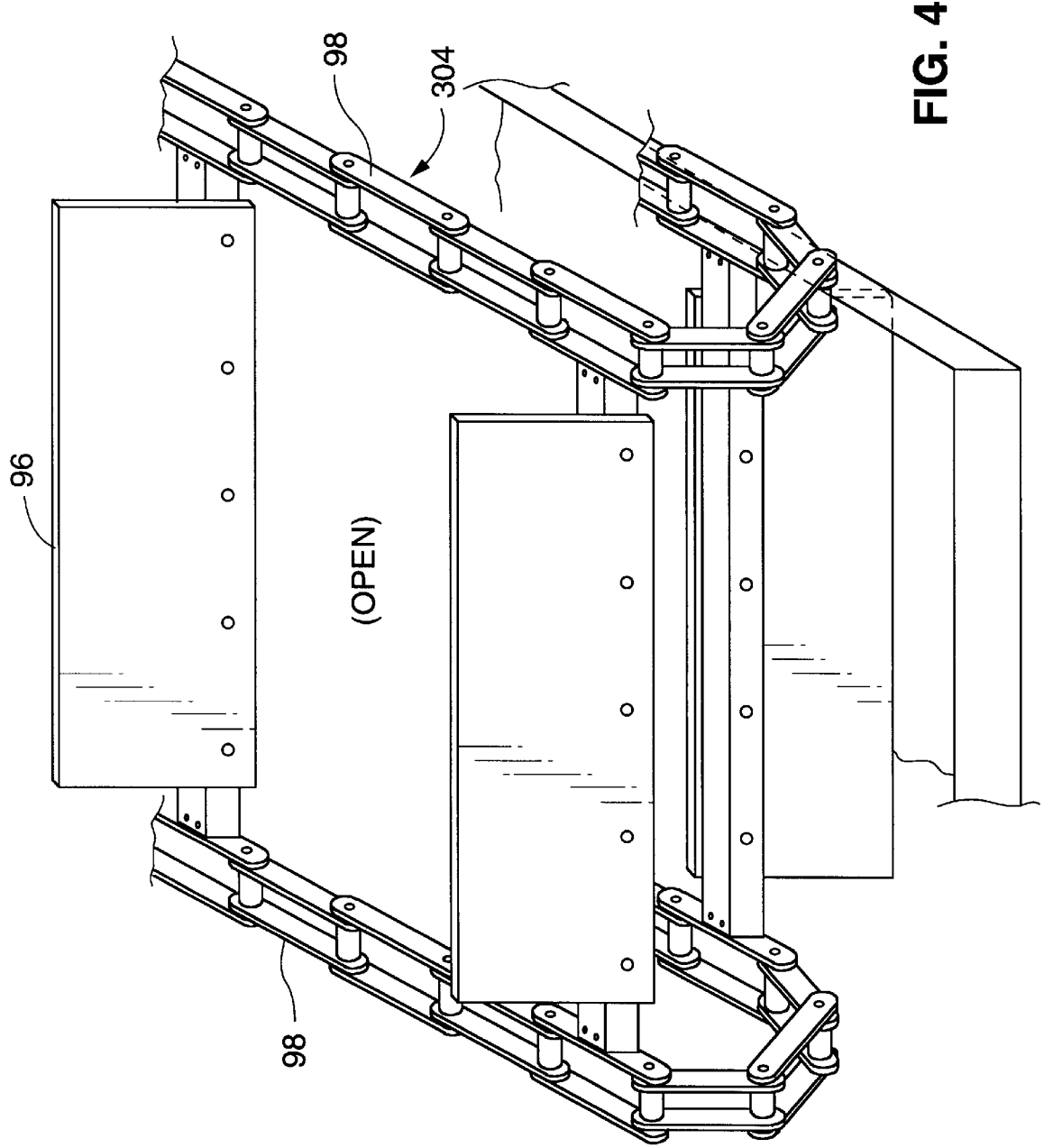
FIG. 4 is an enlarged perspective view of one of the conveyors in FIG. 2.
Figure 5:
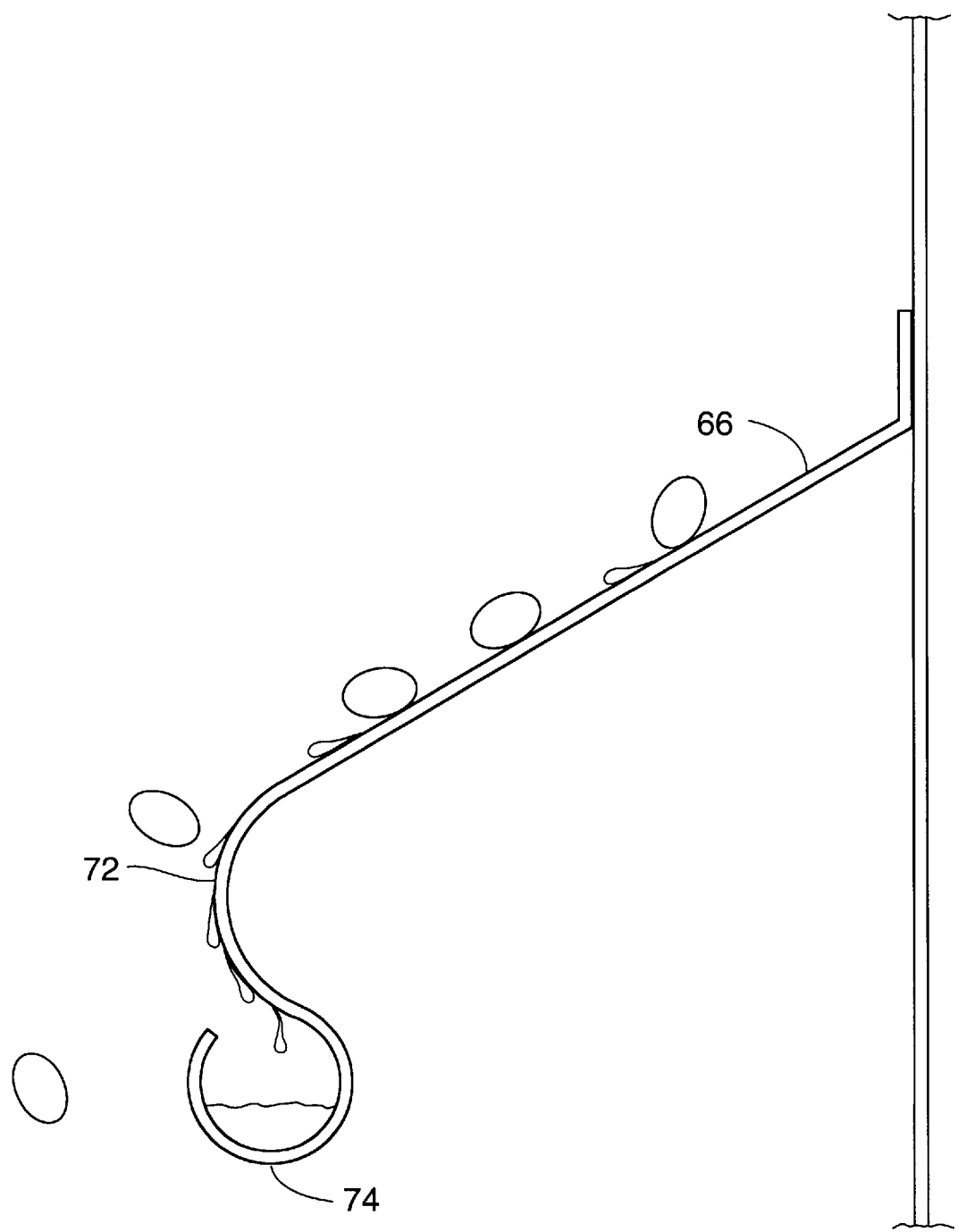
FIG. 5 is an enlarged view of one of the baffles in the drain section of the apparatus in FIG. 2.

The preferred apparatus for practicing the invention is shown in FIGS. 2–5 in which a sodium bicarbonate tank 56 and a bulk hydrogen peroxide tank 58 are provided for treating nuts on a first conveyor 60 and a second conveyor 62. The nuts enter through a inlet 64 provided with a series of downwardly inclined baffles 66 which are shown in greater detail in FIG. 5. A sodium bicarbonate spray is introduced through a nozzle 68 in the form of a heavy spray to thoroughly wet the nuts with sodium bicarbonate. The nuts tumble back and forth between the baffles 66 which shake and drain the sodium bicarbonate solution from the nuts. As can be seen in FIGS. 2 and 5, the lower end of each baffle is provided with a curved surface 72 which guides the excess solution away from the nuts to a collection trough 74 from which the excess solution is recycled by conduit 76. Additional excess solution may pass from the conveyor 60 to conduit 78 and filter 80 to be recycled with fresh sodium bicarbonate solution from tank 56.

Sodium bicarbonate solution is circulated by a pump 82 through a stirring loop 84 to a discharge conduit 86 where it passes to the nozzle 68. Hot water is supplied from water heater 84 to the sodium bicarbonate tank 56 and the temperature of the sodium bicarbonate spray at nozzle 68 is regulated by a temperature sensor 88 which controls a cold water injection valve 90.

The water level in the sodium bicarbonate tank is controlled by high and low level switches and control valves as illustrated in FIG. 3.

The conveyor 60 is provided with a hot water jacket 92 along its bottom covered with an insulation blanket 94 and as illustrated in FIG. 4, the conveyor 60 has a series of paddles 96 mounted on chains 98 which pull the nuts uphill along the bottom heated wall of the conveyor after the nuts fall from the baffles 66.

Conveyor 60 discharges into conveyor 62 where the nuts are sprayed from nozzle 100 with hydrogen peroxide solution. The hydrogen peroxide solution is delivered by a metering pump 102 through check valve 104 into a hot water delivery line 106 which is supplied by hot water pump 108. Temperature of the stream in delivery line 106 is controlled by a temperature sensor 110 which controls a cold water delivery valve 112. Excess hydrogen peroxide solution is recycled from conveyor 62 through conduit 114 and filter 116 to conduit 106. Conveyor 62 discharges into an aging bin 118.

This preferred apparatus of the invention is operated in the following way. In shell nuts are fed in at the inlet 64. The product is preferably free of debris and foreign objects, typically pre-cleaned with an airleg device and dried with a commercial dryer. At nozzle 68 a heavy amount of heated (100°–180° F.) sodium bicarbonate is applied with the nozzle. Full saturation is achieved at this single point to allow a much time as possible for the solution to dry completely as it travels through the machine.

The feed chute with baffles is designed to maximize rolling of the product, to minimize breakage and to take away any excess solution applied at point B. With the shape of the baffles, the solution is pulled away under and into troughs by surface tension and is exhausted through the sides.

Conveyor 60 is a drag style conveyor constructed of 304 stainless steel. The upper run of the conveyor is open so that product can fall through to the lower run. The product is poured onto the inclined lower run where it moves slowly to the top (15 seconds to 1.5 minutes) where it is discharged into conveyor 62. The temperature of the hot water jacket is maintained at about 190° F. to completely dry the surface of the product.

The temperature control sensor 88 is preferably set by 100°–190° F. with the controller for valve 90 preferably mounted at a remote control panel.

The bulk hydrogen peroxide is a 50% solution metered into the hot water stream by pump 102 which brings the solution to a desired pH level as determined by sensor 120 and a remote adjustable controller. The temperature of the stream is controlled by the sensor 110 which controls cold water valve 112.

The hydrogen peroxide stream is regulated to a temperature of about 100° to 180° F. at about 4–20% hydrogen peroxide concentration applied in a very light spray, just enough to cover the product without excessive run off. The product delivered from conveyor 62 to aging bin 118 is held in the aging bin for 5–30 minutes to ensure complete drying and bleaching before the product is packaged.

While certain details of the invention have been illustrated and described herein it is obvious that many modifications thereof may be made which fall within the scope of the following claims.

We claim:

1. A method of bleaching nuts, comprising the steps of:
    (a) providing a plurality of downwardly inclined baffles, and further providing an alkaline solution and a peroxide solution;
    (b) spraying nuts with the alkaline solution;
    (c) draining the alkaline solution from the nuts by tumbling the nuts back and forth between the downwardly inclined baffles and by flowing the alkaline solution away from the nuts by surface tension on the baffles;
    (d) drying the nuts; and then
    (e) spraying the nuts with the peroxide solution.

2. The method of claim 1 wherein step (a) further provides a heated conveyor and wherein step (d) is performed by tumbling the nuts over the heated conveyor.

3. The method of bleaching nuts comprising:
    spraying nuts with a alkaline solution of sodium bicarbonate at a concentration of about 1 to 10% and a temperature of about 100 to 180 degrees F. and a sufficient quantity to thoroughly wet the nuts,
    providing downwardly inclined baffles and draining the nuts by tumbling them back and forth between said baffles and flowing the alkaline solution away from the nuts by surface tension on the baffles;
    drying the nuts, and then
    spraying the nuts with a peroxide solution at a concentration of about 4 to 20% by moving said peroxide from a peroxide source to the nuts while recycling excess quantities of the peroxide solution to the nuts without returning the peroxide solution to said peroxide source.

4. The method of removing aflotoxin from nuts, comprising the steps of:
    (a) providing a plurality of downwardly inclined baffles, and further providing an alkaline solution and a peroxygen solution;
    (b) spraying nuts with the alkaline solution;
    (c) draining the alkaline solution from the nuts by tumbling the nuts back and forth between the downwardly inclined baffles and by flowing the alkaline solution away from the nuts by surface tension on the baffles;
    (d) drying the nuts; and then
    (e) spraying the nuts with the peroxygen solution to cause the alkaline solution and the peroxygen solution to chemically react on the surface of the nuts.

5. The method of claim 3 in which the method further provides a heated surface and in which the step of drying the nuts is performed by tumbling the nuts over said heated surface.

6. The method of claim 4 wherein:
    the step of providing an alkaline solution includes the step of providing a sodium bicarbonate solution; and
    the step of providing a peroxygen solution includes the step of providing a hydrogen peroxide solution.

7. The method of claim 4 in which the providing step further provides a heated surface and in which the step of drying the nuts is performed by tumbling the nuts over said heated surface.

8. The method of removing aflotoxin from nuts, comprising
    (a) providing downwardly inclined baffles;
    (b) spraying nuts with a alkaline solution of sodium bicarbonate at a concentration of about 1 to 10% and a temperature of about 100 to 180 degrees F. and a sufficient quantity to thoroughly wet the nuts,
    (c) draining the alkaline solution from the nuts by tumbling the nuts back and forth between said downwardly inclined baffles and flowing the alkaline solution away from the nuts by surface tension on the baffles;
    (d) drying the nuts; and then
    (e) spraying the nuts with a peroxide solution at a concentration of about 4 to 20% by moving said peroxide from a peroxide source to the nuts while recycling excess quantities of the peroxide solution to the nuts without returning the peroxide solution to said peroxide source.

9. The method of claim 8 in which the providing step further provides a heated surface and in which the step of drying the nuts is performed by tumbling the nuts over said heated surface.

* * * * *